(12) United States Patent
Tsujihara

(10) Patent No.: US 8,154,668 B2
(45) Date of Patent: Apr. 10, 2012

(54) TELEVISION RECEIVER

(75) Inventor: Kazumasa Tsujihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1000 days.

(21) Appl. No.: 12/121,010

(22) Filed: May 15, 2008

(65) Prior Publication Data

US 2008/0291344 A1     Nov. 27, 2008

(30) Foreign Application Priority Data

May 22, 2007   (JP) ................. 2007-134999

(51) Int. Cl.
*H04N 3/14* (2006.01)
*H04N 5/64* (2006.01)
*H05K 7/14* (2006.01)
*H05K 7/18* (2006.01)
*H05K 7/02* (2006.01)
*H05K 7/04* (2006.01)

(52) U.S. Cl. ......... 348/794; 361/802; 361/807; 348/790

(58) Field of Classification Search ................. 348/790, 348/794

See application file for complete search history.

(56) References Cited

U.S. PATENT DOCUMENTS

| 5,467,062 A * | 11/1995 | Burroughs ................. 333/124 |
| 7,046,310 B2 * | 5/2006 | Lee ............................. 348/794 |
| 7,515,222 B2 * | 4/2009 | Yamanaka ................... 349/58 |
| 7,764,332 B2 * | 7/2010 | Zhang ......................... 349/58 |
| 7,929,318 B2 * | 4/2011 | Matsutani .................. 361/802 |
| 2005/0151894 A1 * | 7/2005 | Katsuda et al. ............... 349/58 |
| 2005/0264708 A1 * | 12/2005 | Liao ........................... 348/794 |
| 2006/0001782 A1 * | 1/2006 | Kato .......................... 348/794 |
| 2006/0232723 A1 * | 10/2006 | Maruta ........................ 349/58 |
| 2009/0137133 A1 * | 5/2009 | Gou ............................ 439/63 |

FOREIGN PATENT DOCUMENTS

| EP | 1 777 954 A2 | 4/2007 |
| JP | 3074508 U | 10/2000 |
| JP | 2001-359022 A | 12/2001 |
| JP | 2004-297583 A | 10/2004 |
| JP | 3115175 U | 11/2005 |
| JP | 2006-331827 A | 12/2006 |

OTHER PUBLICATIONS

European Search Report of corresponding EP Application No. 08303.2 dated Feb. 24, 2011.

* cited by examiner

*Primary Examiner* — Pankaj Kumar
*Assistant Examiner* — Randy Flynn
(74) *Attorney, Agent, or Firm* — Global IP Counselors

(57) ABSTRACT

A television receiver includes a liquid crystal module, a control board, a jack holder, a cabinet and a plurality of spacers. The control board has a jack. The jack holder is mounted to the control board to hold the jack. The cabinet houses the liquid crystal module, the control board and the jack holder. The cabinet has an opening to which the jack holder is attached from inner side of the cabinet. The spacers are disposed between the jack holder and the cabinet at locations spaced apart where the jack holder and the cabinet overlap. The spacers maintain a gap between the jack holder and the cabinet.

12 Claims, 4 Drawing Sheets

TELEVISION RECEIVER

CROSS-REFERENCE TO RELATED APPLICATIONS

This application claims priority to Japanese Patent Application No. 2007-134999 filed on May 22, 2007. The entire disclosure of Japanese Patent Application No. 2007-134999 is hereby incorporated herein by reference.

BACKGROUND OF THE INVENTION

1. Field of the Invention

The present invention generally relates to a television receiver. More specifically, the present invention relates to a television receiver having a jack holder attached to a cabinet.

2. Background Information

A conventional liquid crystal television receiver includes a liquid crystal module, a control board, a jack holder, a speaker and a cabinet. The cabinet forms a housing to house the liquid crystal module, the control board, the jack holder and the speaker (see Japanese Laid-Open Patent Application 2006-331827, for example). Jacks (e.g., socket connectors) for connecting to an antenna lead or to an external device such as headphones are disposed on the control board. The jack holder is disposed in a window formed in the cabinet. The jacks are attached to the cabinet via the jack holder.

When the cabinet is molded from plastic, cabinet walls of the cabinet are made as thin as possible to reduce weight and make a flatter package. Furthermore, with the liquid crystal television receiver having the thin-walled cabinet, an edge of the window in which the jack holder is disposed is supported from an inside with a support edge of the jack holder to prevent cracking of the edge of the window.

Specifically, the edge of the window of the cabinet is backed up from the inside by the support edge by overlapping the edge of the window with a support face of the support edge of the jack holder. However, when the support edge of the jack holder and the edge of the window are merely overlapped, sound pressure generated by the speaker built into the cabinet tends to generate "chatter" at a place where the support edge of the jack holder and the edge of the window overlap. In particular, the chatter will be much more likely to grate on the ears if the cabinet has thin walls, and an overlapping portion of the support edge of the jack holder and the edge of the window is formed in a slender shape and the two members come into planar contact. This is because even though the design is such that all of the overlapping portion is in planar contact, in actual practice, the overlapping portion is not in perfectly planar contact due to the effect of error in the planarity of the support face or the edge, or tilt and other such attachment error.

In light of this situation, a nonwoven cloth or other such cushioning material is sandwiched at the overlapping portion between the support face of the support edge of the jack holder and the edge of the window of the cabinet to suppress the generation of chatter by preventing direct contact between the edge and the support face of the support edge.

Meanwhile, another conventional liquid crystal television receiver interpose a nonwoven cloth or other such elastic sheet between a liquid crystal module and a front cabinet to suppress minute vibrations (chatter) in the front cabinet when audio is outputted (see Japanese Utility Model Registration No. 3,115,175, for example).

Also, with another conventional television receiver, a hollow portion is formed at a contact portion between a display face and a housing during an injection molding of the housing to suppress chatter generated at the contact portion between the display face and the housing (see Japanese Laid-Open Patent Application 2004-297583). Also, the chatter is suppressed by disposing a nonwoven cloth at the contact portion between the display face and the housing.

However, the nonwoven cloth or other such cushioning material interposed at the place where chatter occurs to suppress the generation of the chatter increases cost and labor in the assembly process.

In view of the above, it will be apparent to those skilled in the art from this disclosure that there exists a need for an improved television receiver. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a television receiver with which generation of chatter is suppressed without increasing manufacturing cost.

In accordance with one aspect of the present invention, a television receiver includes a liquid crystal module, a control board, a jack holder, a cabinet and a plurality of spacers. The control board has a jack. The jack holder is mounted to the control board to hold the jack. The cabinet houses the liquid crystal module, the control board and the jack holder. The cabinet has an opening to which the jack holder is attached from inner side of the cabinet. The spacers are disposed between the jack holder and the cabinet at locations spaced apart where the jack holder and the cabinet overlap. The spacers maintain a gap between the jack holder and the cabinet.

With the television device of the present invention, it is possible to provide a television receiver with which generation of chatter is suppressed without increasing manufacturing cost.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
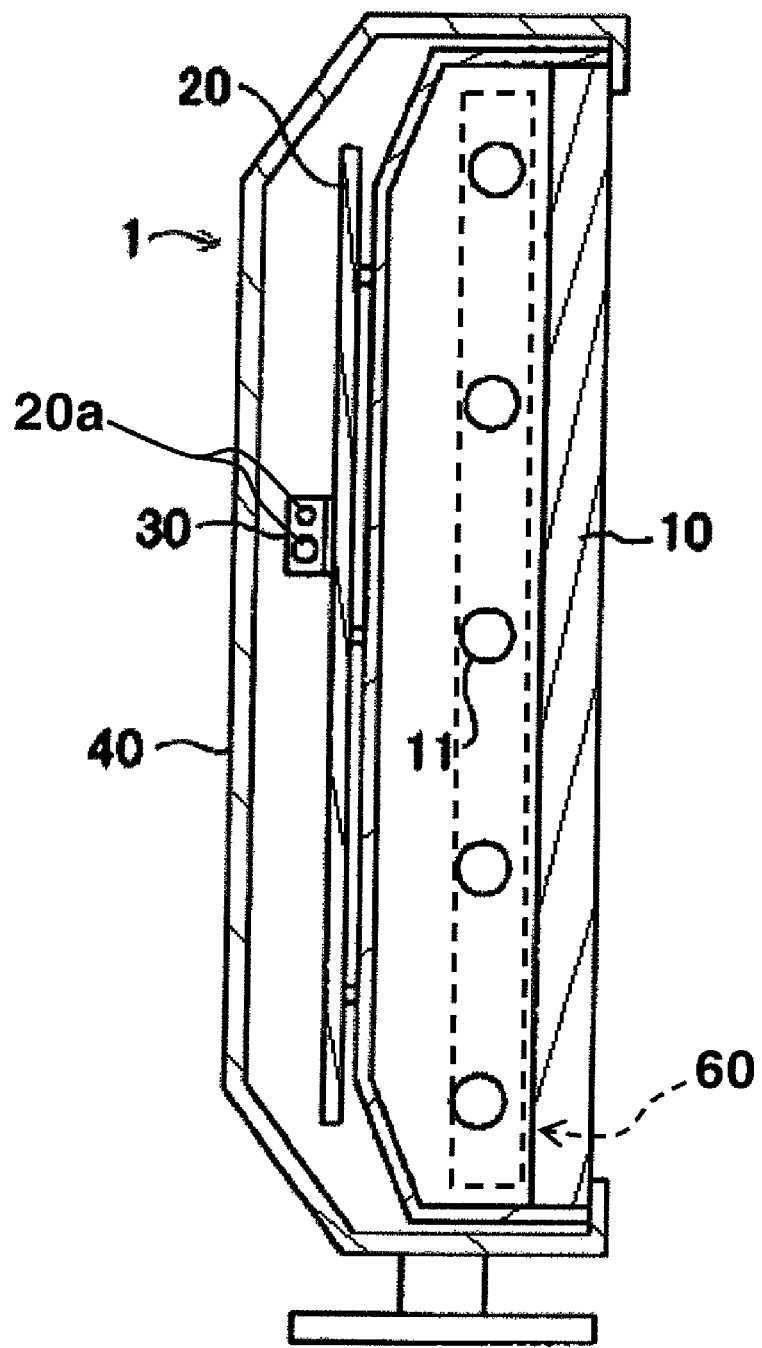
FIG. 1 is a side elevational view in section of a liquid crystal television receiver in accordance with one embodiment of the present invention.

FIG. 1 is a side elevational view in section of a liquid crystal television receiver 1. The liquid crystal television receiver 1 includes a liquid crystal module 10, a plurality of backlights 11, a control board 20, a jack holder 30, a cabinet 40 and a pair of left and right speakers 60. The backlights 11 are disposed on a rear side of the liquid crystal module 10. The control board 20 is attached in an erect orientation so that the control board 20 faces the rear side of the liquid crystal module 10. The control board 20 includes a plurality of jacks 20a (e.g., socket connectors) for connecting to an antenna lead or to an external device such as headphones. The jack holder 30 is mounted on the control board 20 to hold the jacks 20a by being screwed in a lateral-facing orientation to an end of the control board 20. The cabinet 40 serves as a housing to house the liquid crystal module 10, the backlights 11, the control board 20, the jack holder 30 and the left and right speakers 60. The cabinet 40 is molded from a synthetic resin.

Figure 2:
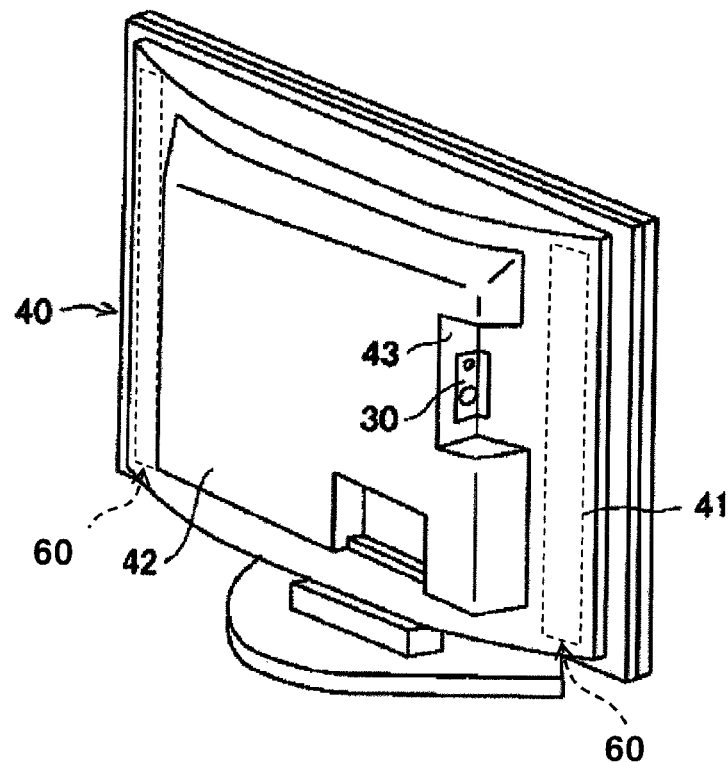
FIG. 2 is a rear perspective view of the liquid crystal television receiver illustrated in FIG. 1.
Figure 3:
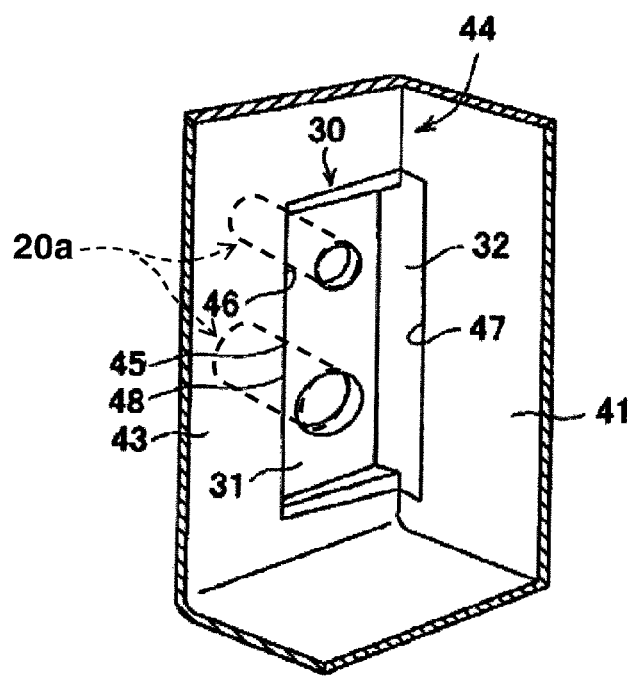
FIG. 3 is a partial enlargement of a jack holder of the liquid crystal television receiver illustrated in FIG. 1.

As shown in FIGS. 2 and 3, the cabinet 40 has a rear panel 41, a bulge 42 and a side panel 43. The rear panel 41, the bulge 42 and the side panel 43 is integrally molded from a synthetic resin as a unitary, one-piece member. The bulge 42 is formed in part of the rear panel 41. The side panel 43 is formed in part of the bulge 42 to extend rearward from the rear side of the rear panel 41. The bulge 42 sticks out to the rear side of the rear panel 41. The rear panel 41 and the side panel 43 sticking out from the rear panel 41 form an inside corner 44. The cabinet 40 is reinforced in its shape by the inside corner 44. The inside corner 44 has a window 45 with an opening 48. The opening 48 includes a laterally-facing open portion 46 and a rear-facing open portion 47. Specifically, the opening 48 extends between the rear panel 41 and the side panel 43 across the inside corner 44 to define the laterally-facing open portion 46 and the rear-facing open portion 47. The laterally-facing open portion 46 is formed in the side panel 43. The rear-facing open portion 47 is linked to the laterally-facing open portion 46, and formed in the rear panel 41. The opening 48 formed by the laterally-facing open portion 46 and the rear-facing open portion 47 serves as the window 45.

Figure 4:
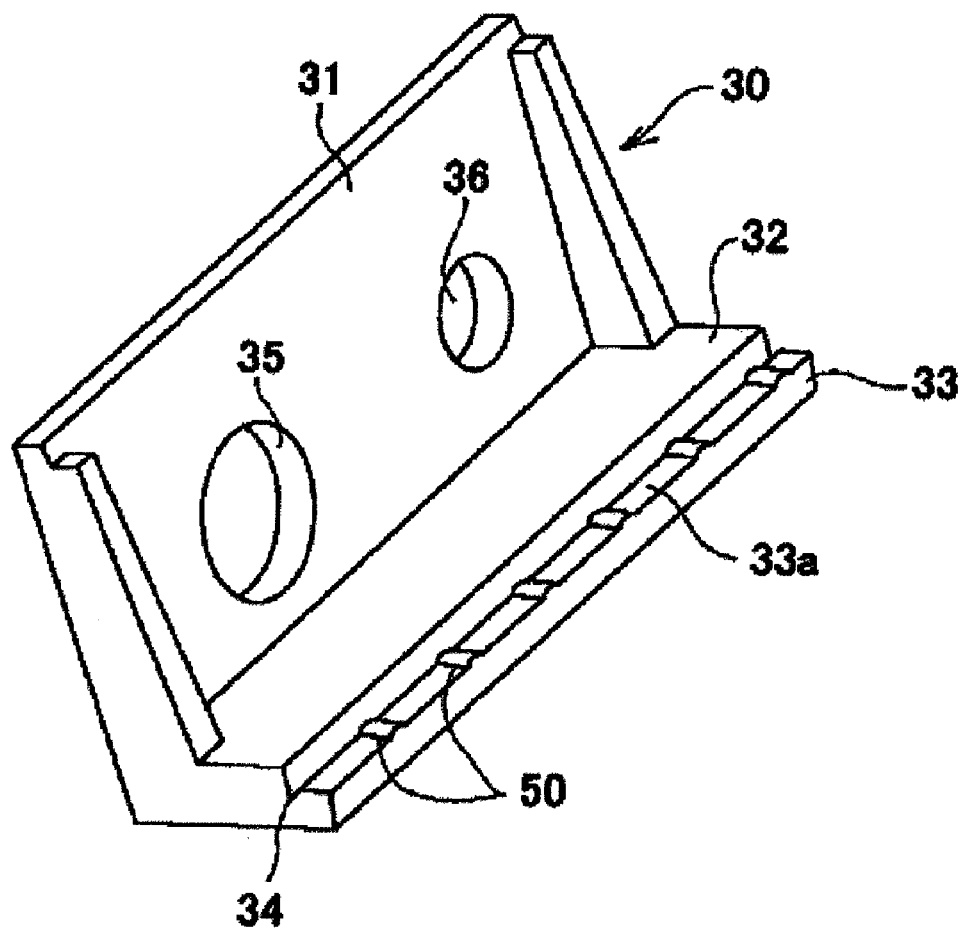
FIG. 4 is a perspective view of the jack holder.

As shown in FIG. 4, the jack holder 30 includes a holder main body 31 and a flange 32. Preferably, the jack holder 30 is a one-piece, unitary member that is injection molded from a suitable resin material. The holder main body 31 is formed in a rectangular plate and has a plurality of holes 35 and 36 that align with the jacks 20a (e.g., plug holes) for an antenna jack or headphone jack, respectively. The flange 32 protrudes from an edge of the holder main body 31 so that the holder main body 31 and the flange 32 intersect. As shown in FIG. 3, the jack holder 30 is disposed in the window 45. More specifically, the holder main body 31 of the jack holder 30 is disposed in the laterally-facing open portion 46 to cover the laterally-facing open portion 46, and the flange 32 is disposed in the rear-facing open portion 47 to cover the rear-facing open portion 47.

Figure 5:
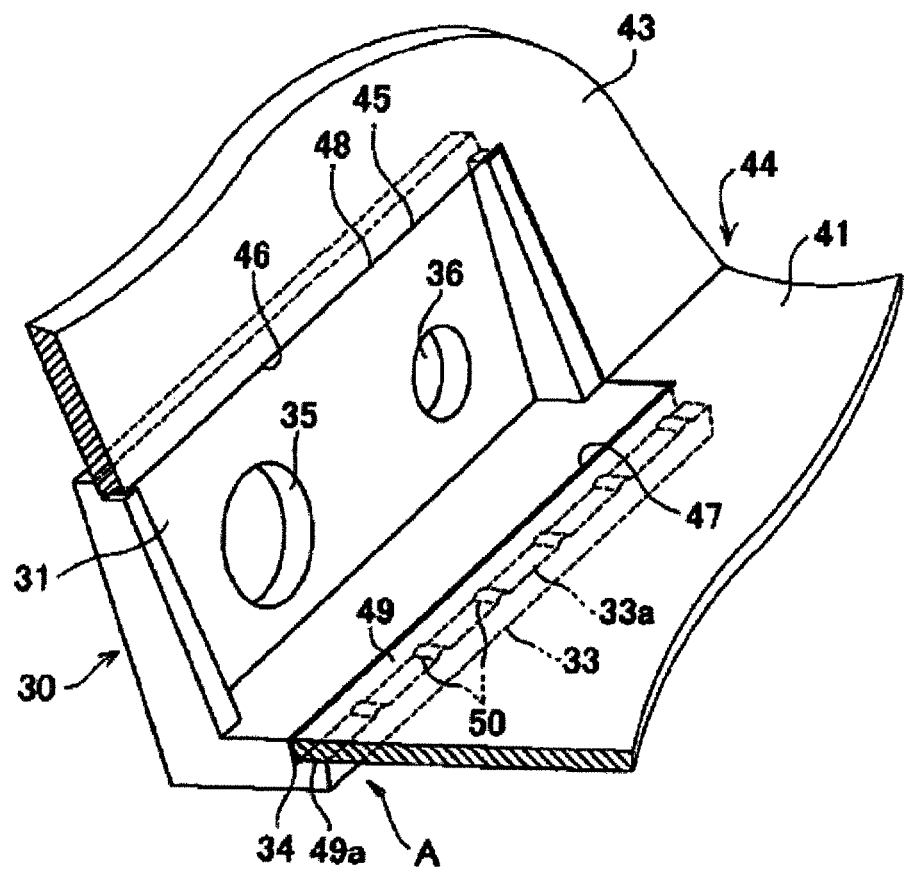
FIG. 5 is a partial enlargement illustrating an overlapping location between the jack holder and a cabinet.

As shown in FIGS. 4 and 5, the flange 32 includes a support edge (e.g., support edge portion) 33 and a relief channel 34. The support edge 33 is formed at the end of the flange 32. The relief channel 34 is provided at a base of the support edge 33. A lateral edge (e.g., edge portion) 49 of the rear-facing open portion 47 overlaps with the support edge 33 in a slender region to form a slender overlapping location (e.g., overlapping portion) A between the support edge 33 and the lateral edge 49 of the rear-facing open portion 47. The support edge 33 supports and backs up the lateral edge 49 of the rear-facing open portion 47 rearward from an inside of the liquid crystal television receiver 1. Therefore, the lateral edge 49 of the rear-facing open portion 47 is reinforced by the support edge 33. As a result, cracking and other such damage are prevented.

Figure 6:
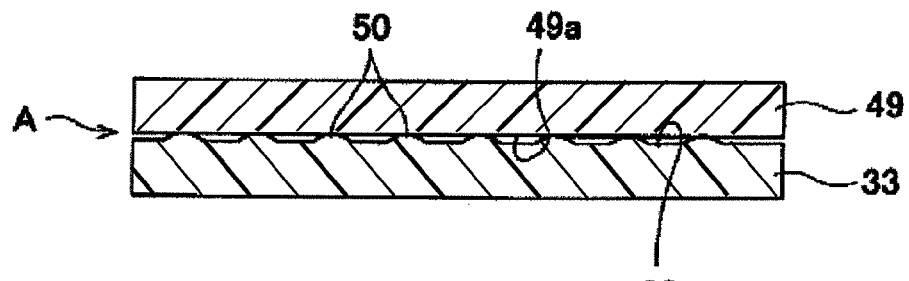
FIG. 6 is a cross sectional view illustrating an overlapping location between the jack holder and the cabinet.

The support edge 33 includes a plurality of protrusions 50 formed on a support face 33a that is formed by a rear surface of the support edge 33. The protrusions 50 constitutes spacers that are integrally molded from resin on the support edge 33. The protrusions 50 are formed on the support face 33a of the support edge 33 of the jack holder 30 at locations spaced apart in a lengthwise direction of the support face 33a so that the protrusions 50 protrude rearward with respect to the support face 33a. Furthermore, as illustrated in FIG. 6, at the slender overlapping location A, the protrusions 50 are interposed between an inner face 49a of the lateral edge 49 and the support face 33a of the support edge 33 to maintain a gap between the inner face 49a of the lateral edge 49 and the support face 33a of the support edge 33.

The support face 33a and the inner face 49a are both formed as a flat face. Furthermore, the jack holder 30 and the cabinet 40 are designed so that the support face 33a and the inner face 49a overlap entirely at the overlapping location A with a planer contact if the protrusions 50 are not disposed on the support face 33a. Even if the design conditions are set in this way, in actual practice, there will be error in the planarity of the support face 33a or the inner face 49a, and there will also be tilt and other such attachment error. When the overlapping location A is affected by such error, the support face 33a and the inner face 49a overlap in imperfect planar contact if the protrusions 50 are not disposed on the support face 33a.

On the other hand, with the liquid crystal television receiver 1, the protrusions 50 are integrally molded on the support face 33a of the support edge 33 of the jack holder 30 so that the inner face 49a of the lateral edge 49 and the support face 33a of the support edge 33 are supported away from each other by the protrusions 50. Therefore, it is less likely that there will be vibration of the support edge 33 of the jack holder 30, or of the lateral edge 49 of the cabinet 40, due to sound pressure from the speakers 60. Accordingly, chatter at the overlapping location A is either eliminated or suppressed, without the use of a nonwoven cloth or other such cushioning material.

In this embodiment, the protrusions 50 are provided to the support face 33a of the support edge 33 of the jack holder 30. However, protrusions can instead be provided to the inner face 49a of the lateral edge 49 of the cabinet 40 so that the protrusions protrude towards the support face 33a, and the protrusions 50 can be omitted from the support face 33a. Also, instead of forming the protrusions 50 integrally with the jack holder 30 or the cabinet 40, spacers produced as separate components can be interposed between the inner face 49a and the support face 33a at locations spaced apart in the lengthwise direction of the overlapping location A so that the inner face 49a of the lateral edge 49 and the support face 33a of the support edge 33 are supported away from each other by the spacers. However, using the spacers produced as separate components instead of the protrusions 50 requires extra components. Therefore, the protrusions 50 are preferably molded integrally from a resin on either the inner face 49a of the lateral edge 49 or on the support face 33a of the support edge 33.

With the liquid crystal television receiver 1, the relief channel 34 is formed at the base of the support edge 33 of the jack holder 30. This prevents the lateral edge 49 overlapping the support edge 33 from lifting up from the support edge 33.

Therefore, the protrusions 50 reliably come into resilient contact with the inner face 49a of the lateral edge 49. As a result, the chatter caused by speaker sound pressure can be suppressed even more effectively.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A television receiver comprising:
a liquid crystal module;
a control board having a jack;
a jack holder mounted to the control board to hold the jack, the jack holder having a hole through which the jack is accessed;
a cabinet housing the liquid crystal module, the control board and the jack holder, the cabinet having an opening to which the jack holder is attached from inner side of the cabinet; and
a plurality of spacers disposed between the jack holder and the cabinet at locations spaced apart where the jack holder and the cabinet overlap, the spacers maintaining a gap between the jack holder and the cabinet, the jack holder and the spacers being integrally formed as a one-piece, unitary member,
the jack holder has a support edge portion with a support face that overlaps with an inner face of an edge portion of the opening to form an overlapping portion, and
the spacers are disposed at locations spaced apart in a lengthwise direction of the overlapping portion.

2. The television receiver according to claim 1, wherein the spacers are integrally formed on one of the support face of the jack holder so that the spacers protrude toward the inner face of the cabinet.

3. The television receiver according to claim 2, wherein the spacers are integrally molded from a resin with the support face of the jack holder as a one-piece, unitary member.

4. The television receiver according to claim 3, wherein the jack holder further includes a holder main body having a flat plate shape to which the jack is attached, and a flange protruding from the holder main body,
the cabinet further includes a rear panel and a side panel that protrudes from the rear panel with the rear and side panels forming an inside corner, and
the opening extends between the rear and side panels across the inside corner to define a laterally-facing open portion in the side panel in which the holder main body is disposed, and a rear-facing open portion in the rear panel in which the flange is disposed.

5. The television receiver according to claim 4, wherein the jack holder further includes a relief channel formed at a base of the sort edge portion that is formed at an end of the flange.

6. The television receiver according to claim 1, wherein the jack holder further includes a holder main body having a flat plate shape to which the jack is attached, and a flange protruding from the holder main body,
the cabinet further includes a rear panel and a side panel that protrudes from the rear panel with the rear and side panels forming an inside corner, and
the opening extends between the rear and side panels across the inside corner to define a laterally-facing open portion in the side panel in which the holder main body is disposed, and a rear-facing open portion in the rear panel in which the flange is disposed.

7. A television receiver comprising:
a liquid crystal module;
a control board having a jack;
a jack holder mounted to the control board to hold the jack:
a cabinet housing the liquid crystal module, the control board and the jack holder, the cabinet having an opening to which the jack holder is attached from inner side of the cabinet; and
a plurality of spacers disposed between the jack holder and the cabinet at locations spaced apart where the jack holder and the cabinet overlap, the spacers maintaining a gap between the jack holder and the cabinet,
the jack holder having a support edge portion with a support face that overlaps with an inner face of an edge portion of the opening to form an overlapping portion, and
the spacers being disposed at locations spaced apart in a lengthwise direction of the overlapping portion.

8. The television receiver according to claim 7, wherein the spacers are integrally formed on one of the support face of the jack holder and the inner face of the cabinet so that the spacers protrude toward the other of the support face of the jack holder and the inner face of the cabinet.

9. The television receiver according to claim 8, wherein the spacers are integrally molded from a resin with one of the support face of the jack holder and the inner face of the cabinet as a one-piece, unitary member.

10. The television receiver according to claim 9, wherein the jack holder further includes a holder main body having a flat plate shape to which the jack is attached, and a flange protruding from the holder main body,
the cabinet further includes a rear panel and a side panel that protrudes from the rear panel with the rear and side panels forming an inside corner, and
the opening extends between the rear and side panels across the inside corner to define a laterally-facing open portion in the side panel in which the holder main body is disposed, and a rear-facing open portion in the rear panel in which the flange is disposed.

11. The television receiver according to claim 10, wherein the jack holder further includes a relief channel formed at a base of the support edge portion that is formed at an end of the flange.

12. The television receiver according to claim 7, wherein the jack holder further includes a holder main body having a flat plate shape to which the jack is attached, and a flange protruding from the holder main body, the cabinet further includes a rear panel and a side panel that protrudes from the rear panel with the rear and side panels forming an inside corner, and the opening extends between the rear and side panels across the inside corner to define a laterally-facing open portion in the side panel in which the holder main body is disposed, and a rear-facing open portion in the rear panel in which the flange is disposed.

* * * * *